1,607,736

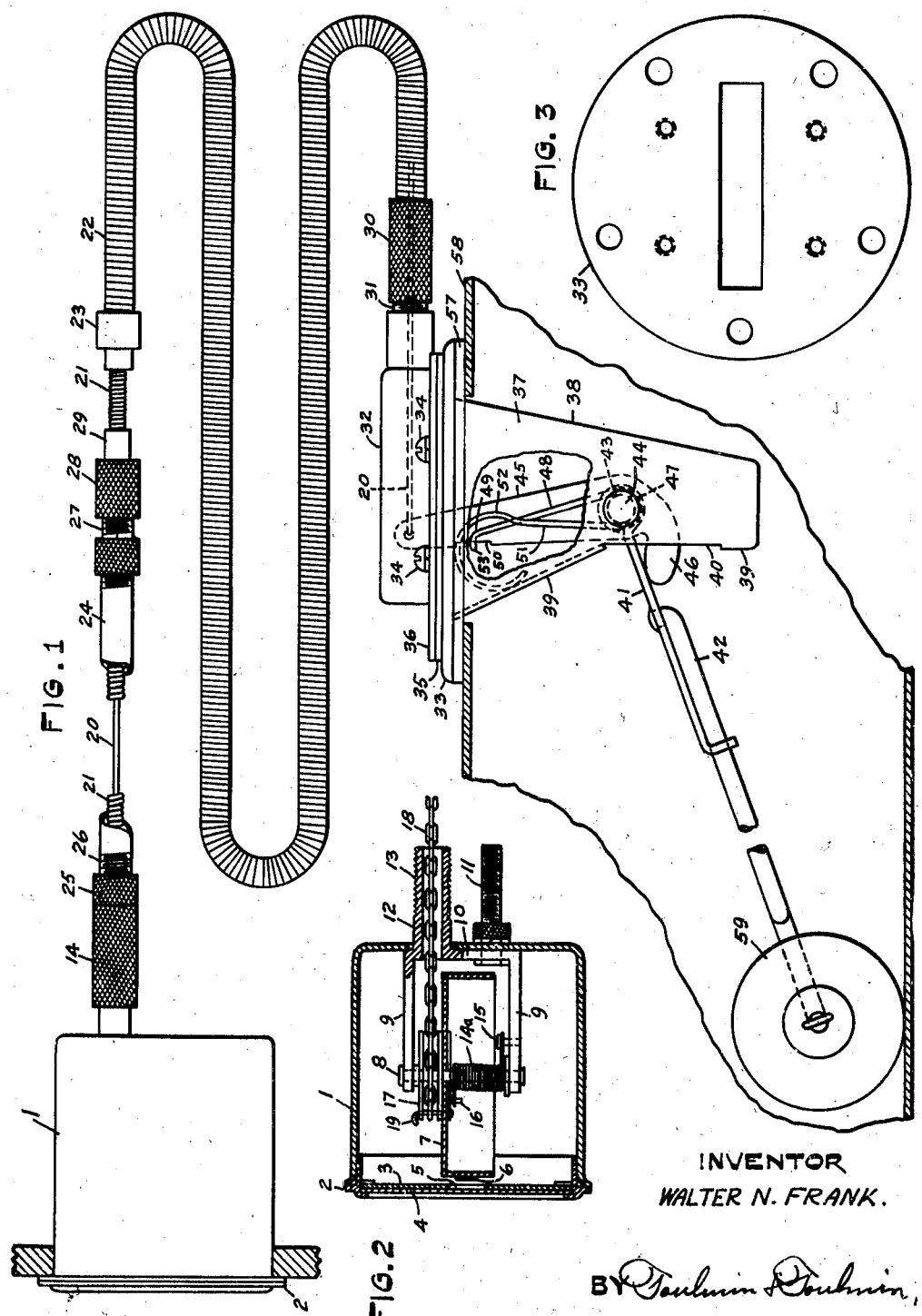

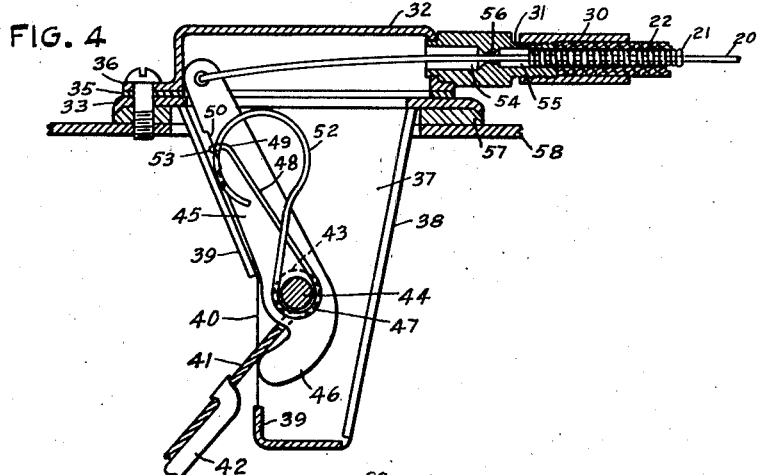
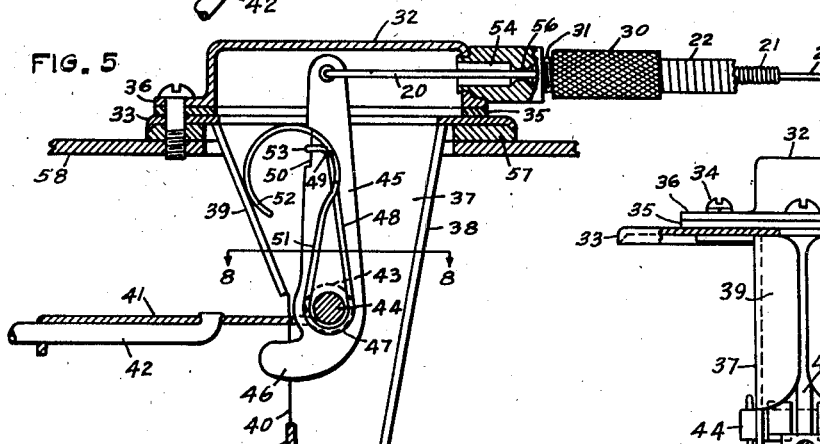
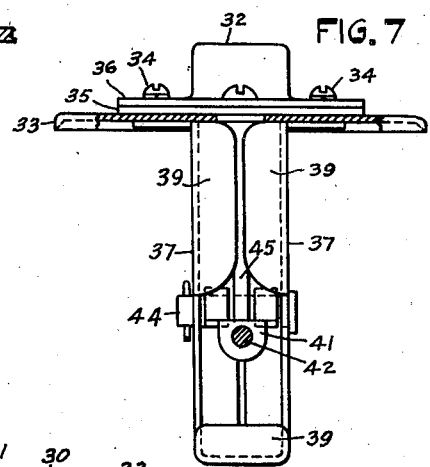
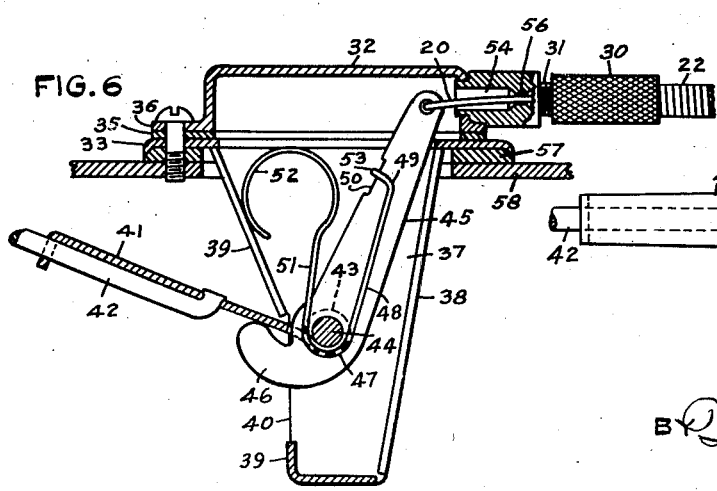
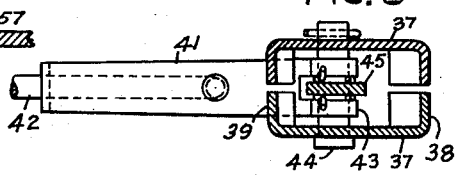
INVENTOR
WALTER N. FRANK.
ATTORNEYS Patented Nov. 23, 1926.

UNITED STATES PATENT OFFICE.

WALTER N. FRANK, OF DAYTON, OHIO, ASSIGNOR TO THE GROLAN MANUFACTURING COMPANY, OF DAYTON, OHIO, A CORPORATION OF DELAWARE.

LIQUID-LEVEL GAUGE.

Application filed February 24, 1925. Serial No. 11,259.

My invention relates to liquid level gauges.

It is the object of my invention to provide a liquid level gauge having a relatively stiff and very strong communicating means from the tank unit to the indicator unit on the dashboard of an automobile to take the place of the relatively fine limber communicating means heretofore employed in such gauges.

It is the object of my invention to provide such a communicating means which will be flexible and therefore unlike the rigid or nearly rigid rods and wires heretofore employed in other types of gauges. In other words, I provide a communicating means which is sufficiently rigid to be capable of taking thrusts around corners and bends without buckling and not too rigid to be passed around corners or bends.

It is an additional object to provide a gauge in which the float may be moved freely with respect to the communicating means in one direction and in which the communicating means will be moved in opposite directions by independent means at either end of the communicating means.

It is my object to provide a gauge in which a yielding means tends to force the wire communicating means forwardly and yielding means in the indicator head attempts to pull the wire forwardly in cooperation therewith. In such a combination it is my object to provide a free moving float arm and float which may travel ahead of the movement of the wire on the up stroke of the float and will travel with the wire when the wire is being pulled backwardly and the float descends, thus saving the wire one half of the thrusts and movements of the float arm, particularly when the float arm makes a quick upward surge due to the bouncing of the automobile on which the gauge is mounted.

It is my object to provide a gauge with a relatively stiff communicating means in a housing connected to a tank unit and an indicator head remote from one another, the wire being pulled yieldingly from the forward end and pushed yieldingly from the rear end and the float and float arm moving independently of the wire in one direction and moving against the springs in the other direction.

It is an additional object to provide a completely enclosed tank unit for enclosing a yielding means and accompanying mechanism connected with the communicating wire to prevent tampering therewith by the person installing the gauge.

Referring to the drawings:

Figure 1 is a side elevation of the complete gauge partially broken away to show the impelling spring in the tank unit with the tank in section;

Figure 2 is a section through the indicator head;

Figure 3 is a plan view of the attaching plate of the tank unit;

Figure 4 is a section taken vertically through the tank unit showing the parts with the float arm in its lowermost position;

Figure 5 is a similar view of the float arm in which it is running ahead of the other parts in its upward movement;

Figure 6 is a similar view showing the float arm in its uppermost position;

Figure 7 is a front elevation from the float end of the tank unit with the float arm in section; and Figure 8 is a section on the line 8—8 of Figure 5.

Referring to the drawings, 1 indicates a case enclosing the indicator unit. There is mounted on the front end of the open cup-shaped case 1 a ring 2 carrying a front plate 3 under the glass 4. This plate is cut away at 5 to disclose the numerals 6 on the drum 7 carried on the shaft 8. This shaft is journalled in the spaced arms of a U-shaped support 9. These arms are connected by a transverse member 10 which is bolted to the inside of the cup 1 by the bolts 11. It also has a tubular extension 12 extending out of the cup having a threaded portion 13 for receiving a knurled sleeve 14 to be hereinafter described.

The shaft 8 has wound around it a light helical spring 14$^a$ one end of which is connected to a stud 15 on the support 9 and the other end of which is connected to a pin 16 which forms a part of the hub of the drum 7. Mounted on this drum and shaft 8 is a pulley 17 carrying a chain 18 connected to a cross pin 19 which passes through the drum and pulley. This chain is connected to the relatively stiff wire 20 which is guided by a closely coiled wire tube 21 which acts as a guide tube. This tube is in turn enclosed throughout the major portion of its length by a main protecting tube 22. The forward end of this main protecting tube is fastened to the inner guiding tube by a clamping sleeve 23.

The forward end of the tube 21 is enclosed by a slidable brass or other metal tube 24. This tube is slidable on the tube 21. It is connected at its forward end by the sleeve 14 to the indicator unit. 25 is a lock nut carried on the threaded end 26 at the forward end of the tube 24. A split clamping sleeve 27 is also provided on the other end of the tube 24 with a clamping nut 28 so that the tube can be clamped in position on the inner tube 21 at any desired position. A limiting sleeve 29 is provided to prevent the brass tube from passing outwardly beyond a predetermined distance.

At the other end of the tube is provided a knurled internally threaded sleeve 30 which is threaded upon the externally threaded sleeve 31. This sleeve 31 is carried on the detachable elongated cup 32 which is mounted on the tank plate 33 by the screws 34. A gasket 35 is interposed between the flange 36 and the tank plate 33.

From the inside of this tank plate is suspended a housing which has parallel side walls 37 and converging end walls 38 and 39, the latter of which is cut away at 40 to permit of the movement of the float arm 41 and its rod 42. This float arm has its inner end turned into an eye 43 so that it can turn upon the transverse pivotal bolt 44 carried on the side walls 37 of the housing. On this bolt 44 is also carried the arm 45 which has depending below the bolt rearwardly a cam finger 46. The arm 41, however, travels freely with respect to the arm 45 and arm 46, save when 41 and 46 engage one another.

Within this housing is located a spring having a looped portion 47 about the bolt 44 and an upwardly extending portion 48 engaging at 49 in a notch 50 at the back of the lever 45 tending to impel the arm forwardly.

The other end of the spring extends upwardly at 51 into a loop 52. This loop engages on the rear wall 39 of the housing.

It will be understood that a similar spring arrangement is found on the other side of the arm 45 and the sides of the spring are connected together by the cross member 53.

Thus the spring tends constantly to push the wire 20 forwardly from the rear end.

It will be noticed that the rear wall 39 is comprised of two wings. This is merely for manufacturing convenience. Any construction is suitable so long as it is one which will properly suspend the parts and enclose them to prevent tampering with them.

It will be further observed that in the tubular member 31 are two enlarged apertures or cylindrical cut away portions 54 and 55 joined by a narrow passageway 56 which acts as a so-called gas lock or means to prevent gasoline from traveling down the tube with the wire.

If desired a gasket 57 may be provided between the tank plate 33 and the tank wall 58.

The tank arm 42 is provided with a circular float 59.

It will be understood that I desire to comprehend within my invention such modifications as may be necessary to adapt it to varying conditions of use.

Having thus fully described my invention, what I claim as new and desire to secure by Letters Patent, is:—

1. In a liquid level gauge, the combination with a tank for the reception of a liquid and provided with a casing of cup form, a bracket depending from the casing within the tank, of an indicator including an indicator drum and a housing therefor, an arm pivotally mounted on said depending bracket and extending into the casing of cup form, a communicating means connected to the end of said arm at one end and its other end operatively connected to the drum, a protecting covering for said communicating means, spring means associated with the drum for imparting a pulling action on the communicating means, and a spring means associated with the arm for imparting a pushing action on said communicating means.

2. In a liquid level gauge, the combination with a tank provided with a housing, a bracket depending from the housing within the tank, of a member pivoted on said bracket with one end extending into said housing and provided with an arm at its other end close to the pivot and projecting laterally, float means mounted on the pivot of said member and responsive to the liquid level and cooperating with said arm when the liquid level lowers, an indicating means including an indicator drum, a communicating connector operatively connected with the drum and attached to said member, a protecting cover for said connector, tensioning means associated with the drum for exerting a pulling action on said connector, and tensioning means mounted on the pivot and cooperatively associated with the member to exert a pushing action on the connector for actuating the indicator drum when the float means responds to the rise of the liquid level in the tank.

3. In a liquid level gauge, the combination with a tank having a bracket operatively supported by and depending within the tank, a member fulcrumed on the bracket comprising long and short arms, the long arm extending radially from the fulcrum, the short arm being curved from the fulcrum with its terminal at approximately right angles to the long arm, float means operatively mounted on the fulcrum and coacting with the terminal of the curved arm, the float means being responsive to the rise of the liquid level, an indicator consisting of an indicator drum, a communicating means connected at one end to the indicator drum and its other end to the long arm of said member, a flexible covering for the communicating means, tensioning means operatively associated with the drum and exerting a pulling action on the communicating means, and spring tensioning means on the fulcrum and cooperating with the long arm of said member for exerting a pushing action on the communicating means as the float means responds to the rise of the liquid level.

In testimony whereof I affix my signature.

WALTER N. FRANK.